United States Patent
Nagafuji et al.

(10) Patent No.: US 8,150,220 B2
(45) Date of Patent: Apr. 3, 2012

(54) OPTICAL WAVEGUIDE WITH LIGHT-EMITTING ELEMENT AND OPTICAL TOUCH PANEL WITH THE SAME

(75) Inventors: Akiko Nagafuji, Ibaraki (JP); Noriyuki Juni, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 0 days.

(21) Appl. No.: 12/908,488

(22) Filed: Oct. 20, 2010

(65) Prior Publication Data
US 2011/0148817 A1    Jun. 23, 2011

(30) Foreign Application Priority Data
Dec. 17, 2009   (JP) ................................ 2009-285844

(51) Int. Cl.
*G02B 6/26* (2006.01)
*G02B 6/42* (2006.01)
(52) U.S. Cl. .............. 385/32; 385/43; 345/175; 345/176
(58) Field of Classification Search ............... 385/32, 385/39, 43–48; 345/173, 175, 176
See application file for complete search history.

(56) References Cited

U.S. PATENT DOCUMENTS

| | | | | |
|---|---|---|---|---|
| 5,799,126 A | * | 8/1998 | Nagatani et al. | 385/146 |
| 5,914,709 A | * | 6/1999 | Graham et al. | 345/179 |
| 6,901,198 B2 | * | 5/2005 | Shimizu et al. | 385/129 |
| 7,164,814 B2 | * | 1/2007 | Ohtsu et al. | 385/14 |
| 2006/0188198 A1 | | 8/2006 | Charters et al. | |

FOREIGN PATENT DOCUMENTS

| | | |
|---|---|---|
| DE | 102006041085 A1 * | 5/2007 |
| JP | 2007-070320 A | 3/2007 |

* cited by examiner

*Primary Examiner* — Daniel Petkovsek
(74) *Attorney, Agent, or Firm* — Westerman, Hattori, Daniels & Adrian, LLP

(57) ABSTRACT

A main path in an optical waveguide with a light-emitting element has two sides faced to each other: one side has a plurality of branched points and the other side does not have any branched points. A width W of the main path becomes narrower as the main path moves away from a light-emitting element. An angle α formed by the main path and a light guiding direction in each branched point of each branched path is 0.1° to 2.0°. An angle θ formed by the other side without branched points and the light guiding direction of the main path is 0.3° to 1.7°.

2 Claims, 8 Drawing Sheets

PRIOR ART

OPTICAL WAVEGUIDE WITH LIGHT-EMITTING ELEMENT AND OPTICAL TOUCH PANEL WITH THE SAME

BACKGROUND OF THE INVENTION

1. Field of the Invention

The present invention relates to an optical waveguide with a light-emitting element having a novel branched structure for generating a plurality of light beams from one light-emitting element. And the present invention also relates to an optical touch panel having the optical waveguide with a light-emitting element.

2. Description of the Related Art

Conventionally, an optical waveguide with a light-emitting element having a branched structure for generating a plurality of light beams from one light-emitting element is known (For example, US 2006/0188198 A1). This kind of optical waveguide with a light-emitting element is preferably used for emitting light beams to a coordinate input region of an optical touch panel.

FIG. 8 shows an optical waveguide 40 with a light-emitting element having a conventional branched structure. In the conventional optical waveguide 40 with a light-emitting element, a plurality of branch points 42 are provided in a direction orthogonal to a light guiding direction 45 of a main path 44 in a core 43 to distribute light emitted from a light-emitting element 41 to respective branched paths 46.

The optical waveguide 40 with such a structure suffered from a wide width W2 of the main path 44 (a cladding layer is filled in each gap 47) because gaps 47 were needed to be located among adjacent branched paths 46. Further, there were such problems that the optical waveguide 40 with a light-emitting element tended to have differences in optical transmission efficiency among the branched paths 46 due to big difference in length among respective branched paths 46 and the intensity of light emitted from respective branched paths 46 tended to be nonuniform.

The optical waveguide 40 with a light-emitting element having a conventional branched structure had a disadvantage of having a wide width W2 of the main path 44 because the plurality of branched points 42 were provided in a direction orthogonal to the light guiding direction 45 in the main path 44. Moreover, the optical waveguide 40 with a light-emitting element also had such a disadvantage that the intensity of light emitted from respective branched paths 46 tended to be nonuniform due to big difference in length among respective branched paths 46.

It is an object of the present invention to realize an optical waveguide with a light-emitting element having a structure in which the width of the main path is narrower than the conventional one and the intensity of light beams emitted from each branched path is uniform.

SUMMARY OF THE INVENTION

The summary of the present invention is as below.

In a first preferred embodiment, an optical waveguide with a light-emitting element according to the present invention comprises: a light-emitting element; and an optical waveguide including a core for guiding light emitted from the light-emitting element to generate a plurality of light beams, wherein the core comprises: a main path; and a plurality of branched paths branched at a plurality of branched points from the main path, the main path has two sides, in which one side has a plurality of branched points and the other side does not have any branched points, the one side having a plurality of branches points and the other side without branched points are faced to each other, the plurality of branched points are provided on a straight line substantially parallel to a light guiding direction of the main path, and the width of the main path becomes narrower as the main path moves away from the light-emitting element. An angle α formed by the main path and the light guiding direction of the main path is 0.1° to 2.0° in each branched point where each branched path is branched from the main path. An angle θ formed by the other side without branched points in the main path and the light guiding direction of the main path is 0.3° to 1.7°.

In a second preferred embodiment, an optical touch panel according to the present invention is equipped with the aforementioned optical waveguide with a light-emitting element.

ADVANTAGES OF THE INVENTION

In the optical waveguide with a light-emitting element of the present invention, it is possible to make a maximum width of the main path in the core of the optical waveguide with a light-emitting element narrower than a maximum width of the main path of a conventional optical waveguide with a light-emitting element by 40% or higher.

The optical waveguide with a light-emitting element of the present invention is capable of achieving the uniformity in distribution of light into respective branched paths as well as reducing the maximum width of the main path.

In the optical touch panel of the present invention, it is possible to make a so-called frame portion narrower by using the optical waveguide with a light-emitting element of the present invention and reduce variation of sensitivity in a coordinate input region by location.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
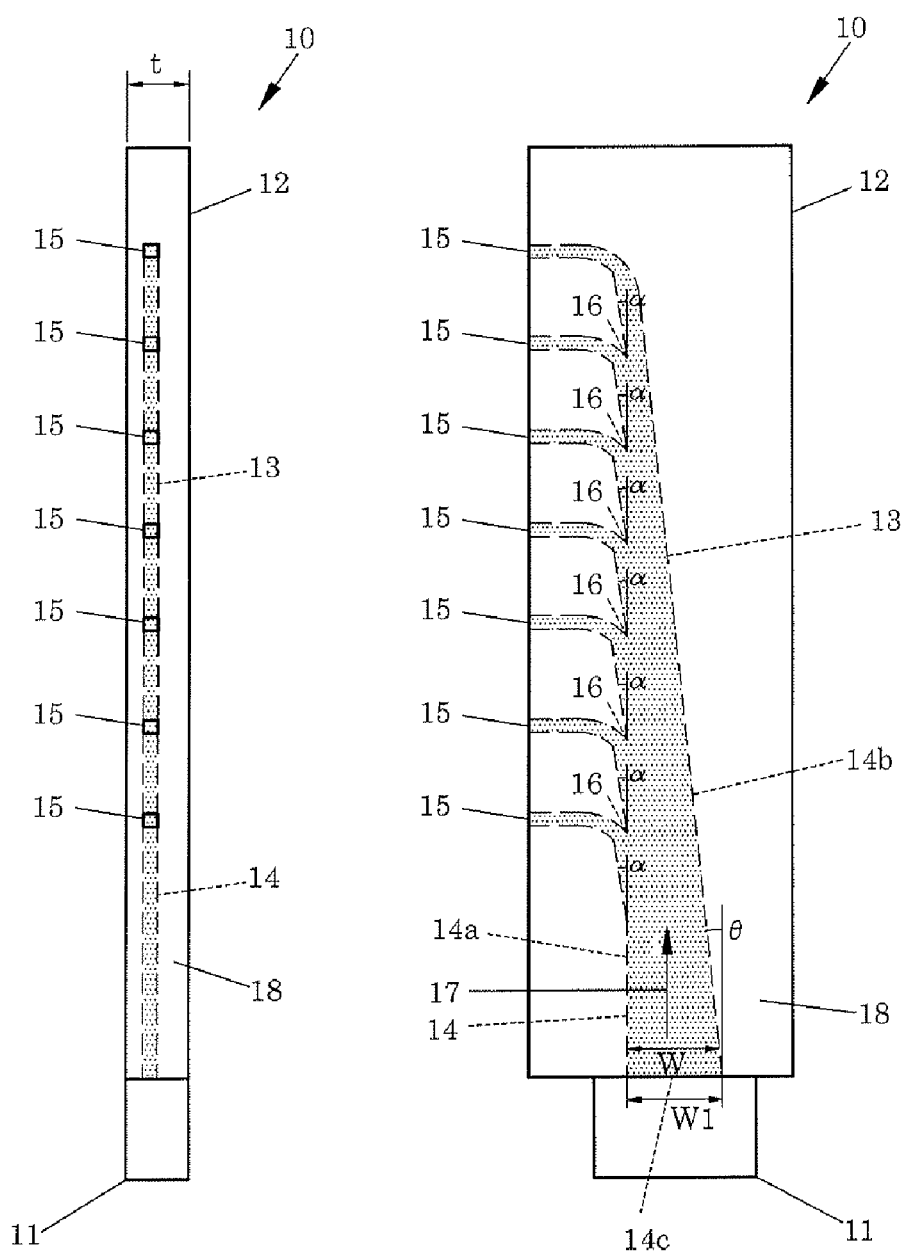
FIG. 1 is a schematic view of an optical waveguide with a light-emitting element of the present invention.

The preferred embodiments of the present invention will now be described with reference to FIGS. 1-8 of the drawings. Identical elements in the various figures are designated with the same reference numerals.

[Optical Waveguide with Light-Emitting Element]

As shown in FIG. 1, an optical waveguide 10 with a light-emitting element of the present invention comprises: a light-emitting element 11; and an optical waveguide 12. The optical waveguide 12 includes a core 13 for guiding light emitted from the light-emitting element 11.

Figure 2:
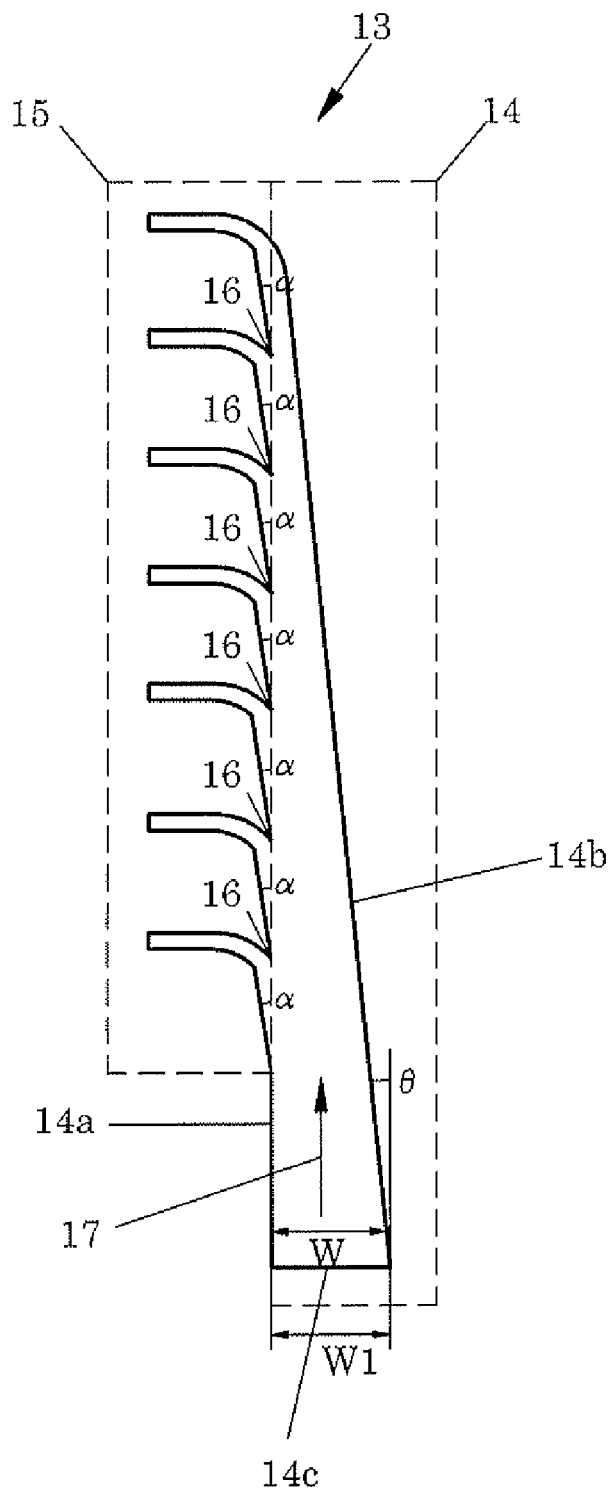
FIG. 2 is a schematic view of a core to be used in the present invention.

FIG. 2 is a schematic view of the core 13. The core 13 comprises: a main path 14; and a plurality of branched paths 15. Respective branched paths 15 are branched from the main path 14 at respective branched points 16. The main path 14 has two sides 14a and 14b. While one side 14a has a plurality of branched points 16, the other side 14b does not have any branched points 16. Respective branched points 16 are provided on a straight line substantially parallel to a light guiding direction 17 of the main path 14. A width W of the main path 14 becomes narrower as the main path 14 moves away from the light-emitting element 11.

The optical waveguide 10 with a light-emitting element of the present invention can reduce a maximum width W1 of the main path 14 because unlike conventional optical waveguides, there is no need to provide any gaps among respective branched paths 15 adjacent to each other. Further, the optical waveguide 10 with a light-emitting element is capable of making intensity of light emitted from respective branched paths 15 even because there are small differences in length among respective branched paths 15 and a large difference in optical transmission efficiency among respective branched paths 15 does not tend to occur.

Figure 3:
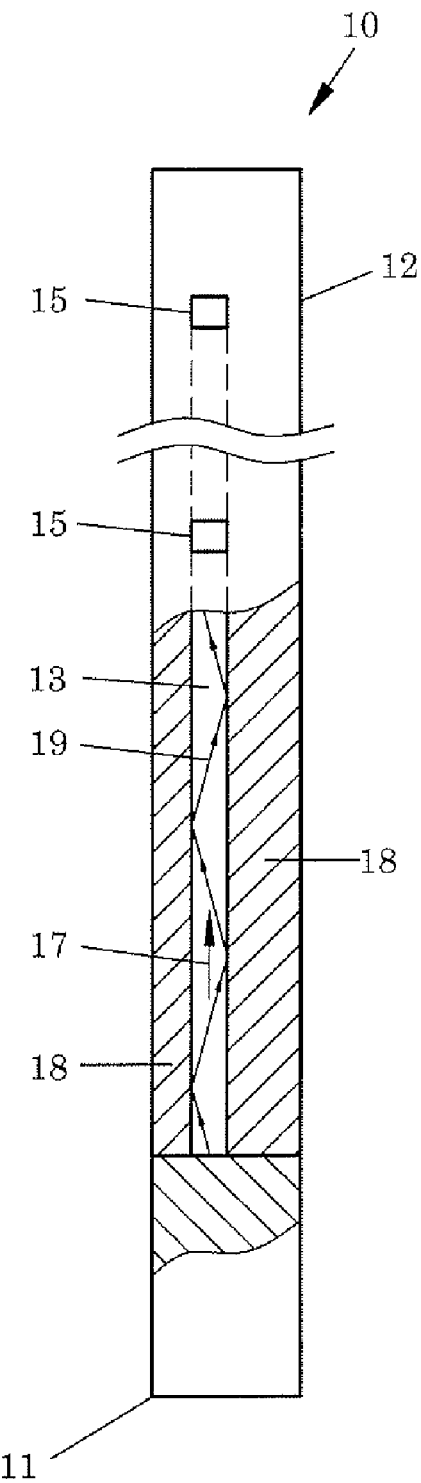
FIG. 3 is a schematic view showing propagation of light in an optical waveguide.

As shown in FIG. 3, light 19 emitted from the light-emitting element 11 propagates while fully reflecting within the core 13 embedded in the optical waveguide 12 to emit from the tips of respective branched paths 15.

As shown in FIGS. 1 and 2, the main path 14 of the optical waveguide 10 with a light-emitting element of the present invention has two sides 14a and 14b. While one side 14a has a plurality of branched points 16, the other side 14b does not have any branched points 16. Respective branched points 16 are provided on a straight line substantially parallel to the light guiding direction 17 of the main path 14. In each branched point 16 where each branched path 15 is branched from the main path 14, an angle α is formed by the main path 14 and the light guiding direction 17 of the main path 14. The angle α is preferably 0.1° to 2.0°, more preferably 0.1° to 1.8°, and further preferably 0.1° to 1.6°.

An angle θ is formed by the other side 14b without branched points 16 and the light guiding direction 17 of the main path 14. The angle θ is preferably 0.3° to 1.7°, more preferably 0.3° to 1.5°, and further preferably 0.4° to 1.0°. The difference between the angle α and the angle θ is preferably 0.5° or lower.

When the angle α and the angle θ are lower than the aforementioned range, the degree of nonuniformity of intensity of light emitted from respective branched paths 15 is larger. On the contrary, when the angle α and the angle θ are over the aforementioned range, the maximum width W1 of the main path 14 becomes wider and becomes closer to a width W2 of a conventional optical waveguide 40 with a light-emitting element.

When the angle α and the angle θ are in the aforementioned range, it is possible to achieve the uniformity in distribution of light into respective branched paths 15 as well as reducing the maximum width W1 of the main path 14.

[Optical Touch Panel]

Figure 4:
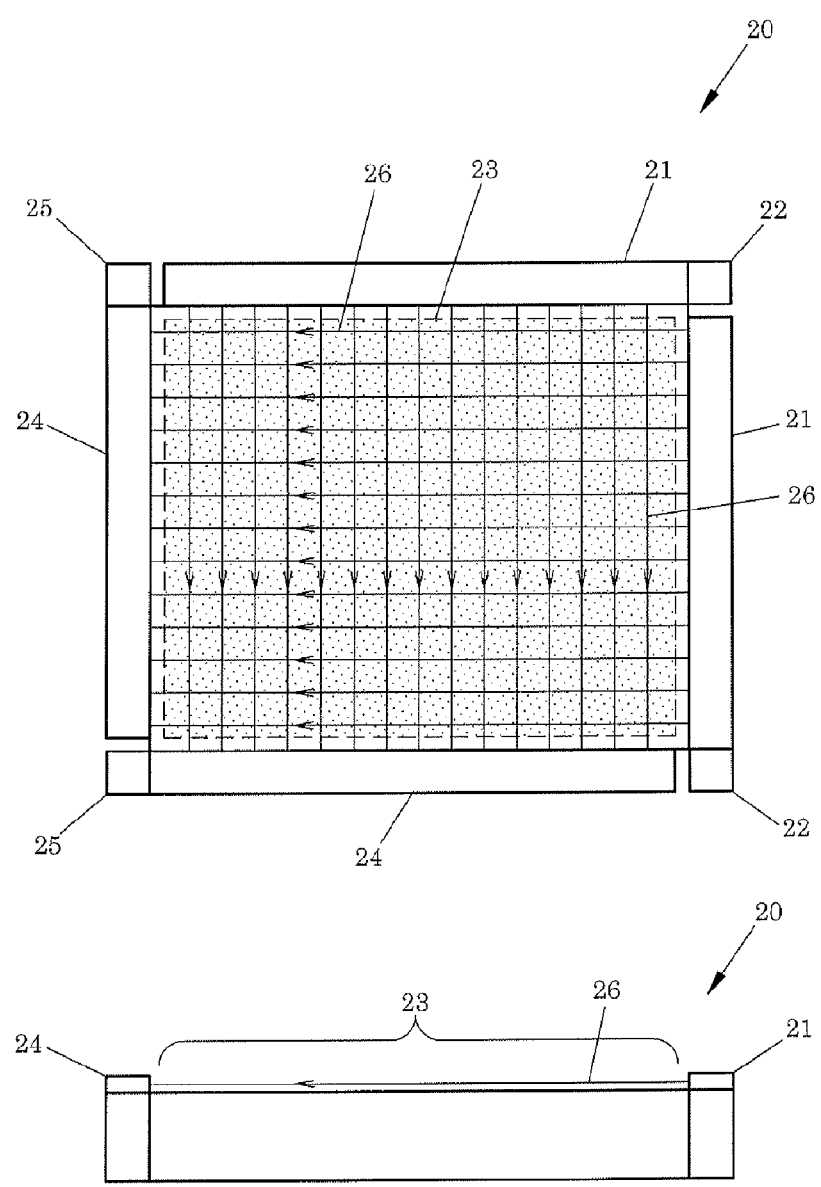
FIG. 4 is a schematic view of an optical touch panel of the present invention.

As shown in FIG. 4, the optical waveguide 10 with a light-emitting element of the present invention is used as a light-emitting sided-optical waveguide 21 and a light-emitting element 22 of an optical touch panel 20 of the present invention.

The optical touch panel 20 of the present invention comprises: a coordinate input region 23; a plurality of light-emitting sided-optical waveguides 21; a plurality of light-emitting elements 22; a plurality of light-receiving sided-optical waveguides 24; and a plurality of light-receiving elements 25. The light-emitting sided-optical waveguides 21 generate light beams 26 for longitudinally or laterally crossing the coordinate input region 23. And the light-receiving sided-optical waveguides 24 receive the light beams 26 having crossed the coordinate input region 23. The light-receiving elements 25 detect the intensity of the light beams 26 received at the light-receiving sided-optical waveguides 24.

In the optical touch panel 20, when part of the light beams 26 for passing through the coordinate input region 23 is blocked by a finger or a pen, it is possible to recognize the coordinates of the finger or the pen because the intensity of light partially incident on the light-receiving elements 25 is reduced.

When a conventional optical waveguide 40 is used as a light-emitting sided-optical waveguide, a width W2 of the main path 44 of the core 43 is obtained by summing the width W2 of approximately 170 branched paths 46 and the gaps 47 among respective branched paths 46, for example, to obtain a resolution of 3 mm or so in the optical touch panel having a diagonal size of 12.1 inches.

On the other hand, when the optical waveguide 10 with a light-emitting element of the present invention is used for an optical touch panel having a diagonal size of 12.1 inches, it is possible to reduce the width W1 of the main path 14 of the core 13 by 40% or higher than the width W2 of the conventional optical waveguide 40 with a light-emitting element.

[Light-Emitting Element]

Any light-emitting element may be used as the light-emitting element 11 to be used for the optical waveguide 10 with a light-emitting element of the present invention as long as the light-emitting element 11 generates the light beams 26 to cross the coordinate input region 23 through the optical waveguide 12.

The light-emitting element 11 is preferably a light-emitting diode or a semiconductor laser, more preferably a VCSEL (Vertical Cavity Surface Emitting Laser). A VCSEL is excellent in optical transmission efficiency because light in a VCSEL is resonated in a direction perpendicular to a substrate surface and can emit light in a perpendicular direction to the substrate surface.

The wavelength of light emitted from the light-emitting element 11 is preferably within the near-infrared region (700 nm to 2,500 nm).

[Optical Waveguide]

The core 13 for generating a plurality of light beams by guiding light emitted from the light-emitting element 11 is embedded in the optical waveguide 12 to be used for the optical waveguide 10 with a light-emitting element of the present invention. Generally, an end 14c of the main path 14—side on the core 13 is optically coupled (optical coupling) to the light-emitting element 11.

A method for optical coupling is not particularly limited, but examples of the method include a method for adjusting so that the center position of light intensity distribution of the light-emitting element 11 may be coincident with the center of the core 13 or a method for using an optical path conversion mirror. For example, the optical path conversion mirror is a V-shaped groove formed by a dicing process.

The core 13 comprises the main path 14 and the plurality of branched paths 15. Each branched path 15 is branched from the main path 14 at each branched point 16. The main path 14 has two sides 14a and 14b. One side 14a has a plurality of branched points 16, however the other side 14b does not have any branched points 16.

The term "a branched point 16" herein refers to a portion where side walls of the adjacent branched paths 15 meet. And as shown in FIG. 3, the term "a light guiding direction 17" herein refers to a traveling direction of light 19 propagating within the core 13 and more specifically, as shown in FIG. 1, to a traveling direction of light within the main path 14 before the branched paths 15 are branched from the core 13.

The maximum width W1 of the main path 14 of the core 13 is determined according to the size of the optical touch panel, but is typically 500 to 10,000 µm. The height (thickness) of the main path 14 is preferably 30 to 100 µm.

As shown in FIGS. 1 and 2, respective branched points 16 are provided on a straight line and the straight line is substantially parallel to the light guiding direction 17 of the main path 14. The expression "substantially parallel" means that the deviation from the true parallel direction between the straight line on which respective branched points 16 are located and the light guiding direction 17 of the main path 14 is less than 0.1°.

The width W of the main path 14 becomes narrower as the main path 14 moves away from the light-emitting element 11 along the light guiding direction 17 of the main path 14. The decreasing rate of the width W of the main path 14 depends on the angle θ formed by the other side 14b without branched points 16 and the light guiding direction 17 of the main path 14.

It is difficult to achieve the uniformity in intensity of light beams emitted from respective branched paths 15 when the angle θ formed by the other side 14b without branched points 16 and the light guiding direction 17 of the main path 14 is less than 0.3°.

When the angle θ is over 1.7°, the maximum width W1 of the main path 14 becomes wider and becomes closer to the width W2 of the main path 44 in an optical waveguide 40 with a light-emitting element having a conventional branched structure, which makes it impossible to obtain sufficient advantages in the present invention.

It is possible to achieve the uniformity in intensity of light beams emitted from respective branched paths 15 by setting the angle θ formed by the other side 14b without branched points 16 of the main path 14 and the light guiding direction 17 of the main path 14 at 0.3° to 1.7° as well as reducing the maximum width W1 of the main path 14.

The number of the branched paths 15 branched from one main path 14 is determined according to the size of the optical touch panel, but is preferably 40 to 500. Spaces among the adjacent branched points 16 provided in the light guiding direction 17 of the main path 14 are preferably 100 to 2,000 µm.

The cross-sectional shape of the core 13 (the main path 14 and the branched paths 15) is not particularly limited, but is preferably a trapezoid or a rectangle with excellent patterning properties. The optical waveguide 12 of such configuration has superior propagation characteristics of light beams.

The core 13 is generally embedded in a cladding layer 18 and made of a material having a refractive index higher than that of the cladding layer 18. A material for forming the core 13 is preferably a UV curable resin having excellent patterning properties.

Preferred examples of such a UV curable resin include UV curable acrylic resins, UV curable epoxy resins, UV curable siloxane resins, UV curable norbornene resins, and UV curable polyimide resins or the like.

The cladding layer 18 is generally made of a material having a lower refractive index than the core 13. The material of the cladding layer 18 is not particularly limited, but preferable examples thereof include glass, silicone, metals or resins and the like. The cladding layer 18 may be constituted from a single layer or multiple layers. In the case of two-layers, typically, the cladding layer 18 comprises: an under-cladding layer; and an over-cladding layer. The cladding layer 18 preferably has a thickness t of 5 to 20 µm.

The maximum refractive index difference between the core 13 and the cladding layer 18 is preferably 0.01 or more, more preferably 0.02 to 0.2. The refractive index of a resin for forming the core 13 and the cladding layer 18 can be increased or decreased as appropriate according to the kind and the content of an organic group introduced into the resin.

For instance, the refractive index can be increased by the introduction of a cyclic aromatic group (e.g., a phenyl group) into a resin molecule or by increasing a cyclic aromatic group content per resin molecule.

On the other hand, the refractive index can be decreased by, for example, introducing a linear or an aliphatic group (e.g., a methyl group or a norbornene group) into a resin molecule or increasing a linear or aliphatic group content per resin molecule.

The optical waveguide 12 can be formed by any method, such as a dry etching method using plasma, a transfer method, an exposure and development method or a photobleaching method or the like.

[Coordinate Input Region]

In this specification, the word "coordinate input region 23" refers to a region where the light beams 26 generated from the light-emitting sided-optical waveguides 21 travel in the present invention. The optical touch panel 20 of the present invention provides a coordinate input with a finger or a pen by blocking part of the light beams 26 crossing the coordinate input region 23.

The coordinate input region 23 is typically a display screen of a liquid crystal display or a plasma display. An open space may be provided in front of the coordinate input region 23. Alternatively, a glass panel or an acrylic plate may be provided on the surface of the coordinate input region 23. In this case, a glass panel or an acrylic plate is used to improve scratch resistance. The surface of the glass panel or the acrylic plate may be anti-reflection (AR) treated or anti-glare (AG) treated.

[Light-Receiving Sided-Optical Waveguide]

Figure 5:
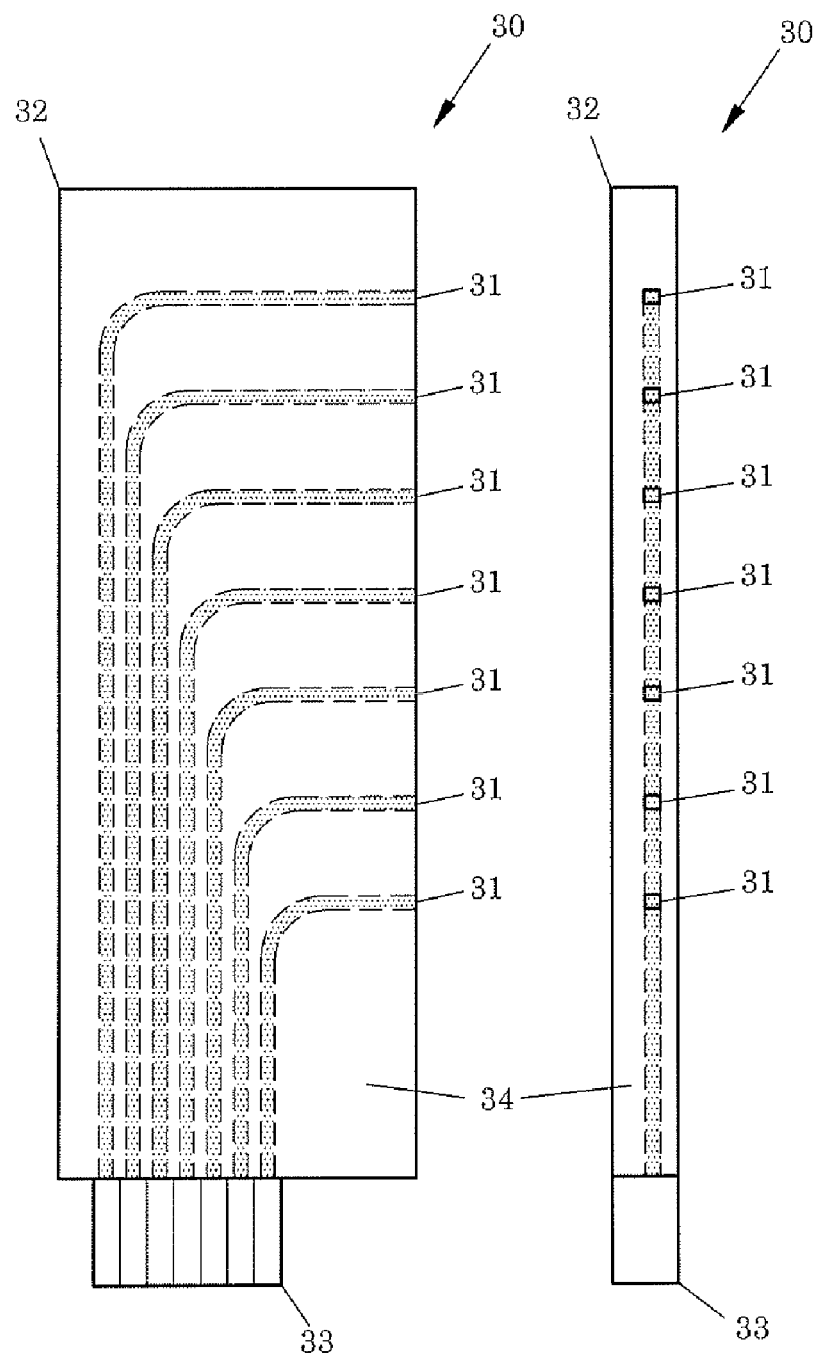
FIG. 5 is a schematic view of an optical waveguide with a light-receiving element.

The light-receiving sided-optical waveguides 24 to be used for the touch panel 20 shown in FIG. 4 is not particularly limited as long as the light-receiving sided-optical waveguides 24 receive the light beams 26 having crossed the coordinate input region 23. As shown in FIG. 5, a light-receiving sided-optical waveguide 32 preferably comprises: a plurality of cores 31; and a cladding layer 34 wherein the cores 31 are embedded. In the light-receiving sided-optical waveguide 32, one end of the respective cores 31 is provided toward the coordinate input region 23 and the other end of the respective cores 31 is optically coupled to a plurality of light-receiving elements 33. The optical waveguide 30 with a light-receiving element comprises: the light-receiving sided-optical waveguide 32; and the light-receiving element 33.

In principle, the resolution of the optical touch panel 20 using optical waveguides is determined according to the number of the cores 31 of the light-receiving sided-optical waveguides 32 optically coupled to the plurality of light-receiving elements 33. Thus, a plurality of cores 31 for optically coupled to the light-receiving elements 33 are needed. However, in a light-emitting sided-optical waveguide 12, as shown in FIGS. 1 and 2, the number of the main path 14 of the core 13 to be needed may be one in the part optically coupled to the light-emitting element 11 as far as parallel light beams 26 can be emitted to the coordinate input region 23.

[Light-Receiving Element]

The light-receiving element 33 to be used in the present invention converts an optical signal into an electrical signal to detect light 26 received at the light-receiving sided-optical waveguide 32. The light 26 detected from the light-receiving element 33 preferably has a wavelength in a near-infrared area (700 to 2,500 nm).

The structure of the light-receiving element 33 is preferably a one-dimensional image sensor wherein light-receiving portions (e.g., photo diodes) are aligned. Examples of such a light-receiving element 33 include a Complementary Metal-oxide Semiconductor (CMOS) image sensor and a Charge Coupled Device (CCD) image sensor or the like.

EXAMPLE

Example 1

Preparation of Varnish for Forming a Cladding Layer

A varnish for forming a cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl))butoxyphenyl)butane (synthesized in accordance with Example 2 in JP 2007-070320 A) (Component E), 1 part by weight of the Component B, and 41 parts by weight of ethyl lactate.

[Formation of Optical Waveguide with Light-Emitting Element]

The varnish for forming the aforementioned cladding layer was applied onto the surface of a polyethylene naphthalate (PEN) film having a thickness of 188 μm, irradiated with UV light at 1,000 mJ/cm$^2$, and thermally-treated at 80° C. for 5 minutes to form an under-cladding layer having a thickness of 20 μm. The refractive index of the under-cladding layer as measured at a wavelength of 830 nm was 1.510.

Then, the varnish for forming cores was applied onto the surface of the under-cladding layer and drying treated at 100° C. for 5 minutes to form a core layer. The core layer was then covered with a photo mask (gap: 100 μm), irradiated with UV light at 2,500 mJ/cm$^2$, and thermally-treated at 100° C. for 10 minutes.

An unexposed portion of the core layer was dissolved away using an aqueous γ-butyrolactone solution and thermally treating the core layer at 120° C. for 5 minutes to form the patterns of a plurality of cores. The patterned cores respectively comprise: a main path (maximum width=3,239 μm; height: 50 μm); and 274 branched paths (width: 15 μm, height: 50 μm) sequentially branched in a light guiding direction of the main path. The refractive index of each of the cores at a wavelength of 830 nm was 1.592.

As shown in FIG. 1, a core 13 included in the optical waveguide 10 with a light-emitting element comprises: a main path 14; and a plurality of branched paths 15 branched from the main path 14. The main path 14 has two sides 14a and 14b and one side 14a has a plurality of branched points 16 and the other side 14b does not have any branched points 16.

As shown in FIG. 1, the position of each branched point 16 is located on a straight line and the straight line is substantially parallel to the light guiding direction 17 of the main path 14. In the main path 14, the width W becomes narrower as the main path 14 moves away from the light-emitting element 11 along the light guiding direction 17 of the main path 14.

An angle α formed by the main path 14 and the light guiding direction 17 of the main path 14 at each branched point 16 where each branched path 15 is branched from the main path 14 is 0.85°. An angle θ formed by the other side 14b without branched points 16 and the light guiding direction 17 of the main path 14 is 0.7°.

Next, a transparent concave-shaped molding die (made of quartz) was placed so as to fill the varnish for forming a cladding layer inside the concave-shaped molding die. The concave-shaped molding die was irradiated with UV light at 2,000 mJ/cm$^2$ from the surface (outside) of the concave-shaped molding die and then was thermally treatment at 80° C. for 5 minutes.

Subsequently, the concave-shaped molding die was released to form an over-cladding layer with a convex lens having a side sectional shape of a substantially quarter of a circle at its distal end. The over-cladding layer had a thickness of 1 mm and its refractive index as measured at a wavelength of 830 nm was 1.510. The convex lens had a radius of curvature of 1.5 mm.

Next, a light-emitting elements (VCSEL manufactured by Optowell Co., Ltd.) for emitting light having a wavelength of 850 nm was coupled to an end of the main path in each of the cores via a UV curable resin to produce an optical waveguide with a light-emitting element.

Example 2

The optical waveguide 10 with a light-emitting element was produced in the same manner as in Example 1 except for changing the photo mask to set the angle α formed by the main path 14 and the light guiding direction 17 of the main path 14 at 0.1° in each branched point 16 where each branched path 15 is branched from the main path 14 and set the angle θ formed by the other side 14b without branched points 16 and the light guiding direction 17 of the main path 14 at 0.4°.

Example 3

The optical waveguide 10 with a light-emitting element was produced in the same manner as in Example 1 except for changing the photo mask to set the angle α formed by the main path 14 and the light guiding direction 17 of the main path 14 at 1.4° in each branched point 16 where each branched path 15 is branched from the main path 14 and set the angle θ formed by the other side 14b without branched points 16 and the light guiding direction 17 of the main path 14 at 1.0°.

Comparative Example 1

Figure 8:
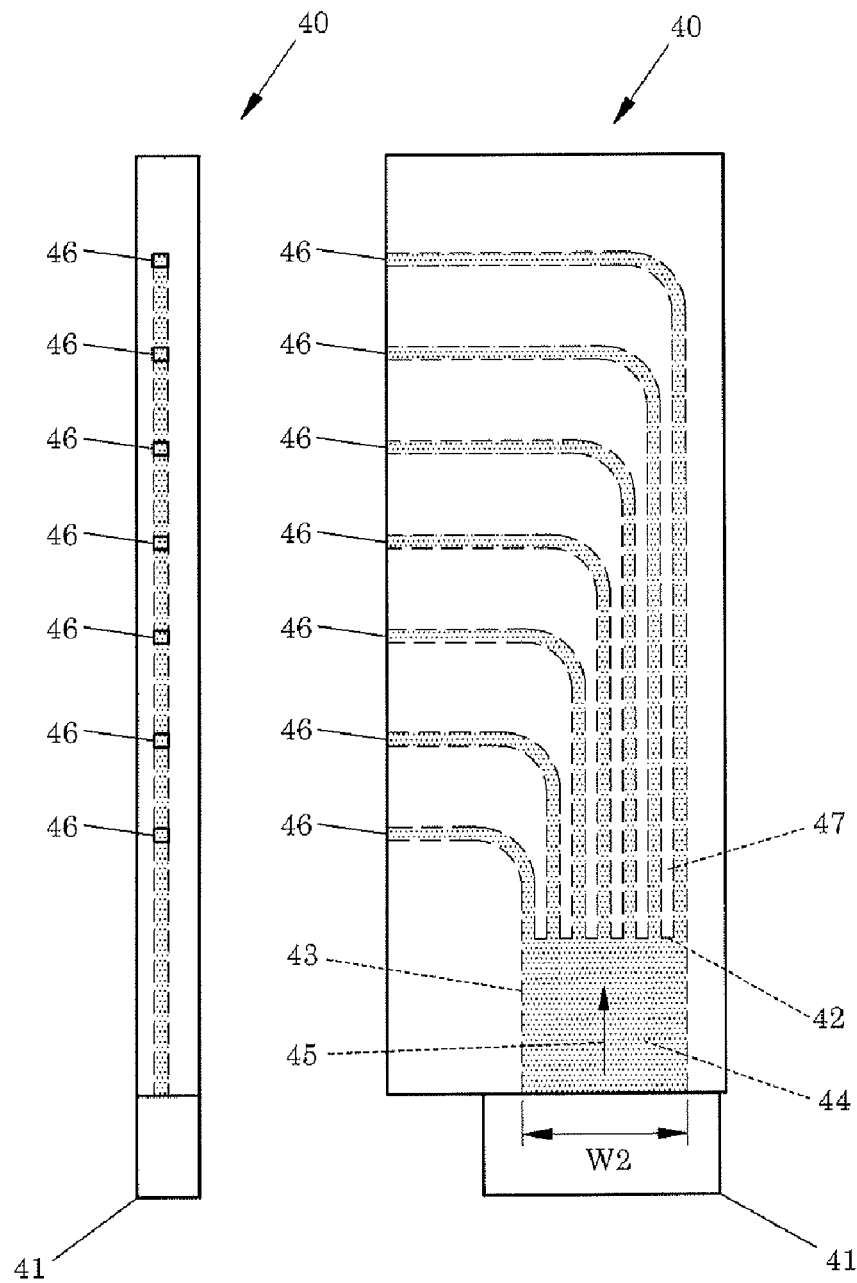
FIG. 8 is a schematic view of a conventional optical waveguide with a light-emitting element.

Changing the photo mask, a core 43 including a main path 44 and 274 branched paths 46 in which branched points 42 are arranged so as to be orthogonal to a light guiding direction 45 of the main path 44 was formed as shown in FIG. 8. The main path 44 in the core 43 has a maximum width W2 of 8,205 μm and a height of 50 μm, and the branched paths 46 respectively have a width of 15 μm and a height of 50 μm. And spaces 47 among the adjacent branched paths 46 are 15 μm (×273). An optical waveguide 40 with a light-emitting element was produced in the same manner as in Example 1 except for the above.

Comparative Example 2

The optical waveguide 10 with a light-emitting element was produced in the same manner as in Example 1 except for changing the photo mask to set the angle α formed by the main path 14 and the light guiding direction 17 of the main path 14 at 0.05° in the branched point 16 where each branched path 15 is branched from the main path 14 and set the angle θ formed by the other side 14b without branched points 16 and the light guiding direction 17 of the main path 14 at 0.2°.
[Evaluation 1]
Table 1 shows maximum widths of the main path of the core in an optical waveguide with a light-emitting element obtained in Examples 1 to 3 and Comparative Example 1. As can be seen from the Table 1, the optical waveguide with a light-emitting element obtained in Examples 1 to 3 has a maximum width of the main path in the core by 40% or higher narrower than that of the optical waveguide with a light-emitting element obtained in Comparative Example 1.

TABLE 1

|  | Configuration | Angle α (°) | Angle θ (°) | Maximum width of main path (μm) |
|---|---|---|---|---|
| Example 1 | FIG. 1 | 0.85 | 0.7 | 3,239 |
| Example 2 | FIG. 1 | 0.1 | 0.4 | 1,863 |
| Example 3 | FIG. 1 | 1.4 | 1.0 | 4,614 |
| Comparative Example 1 | FIG. 8 | — | — | 8,205 |

Figure 6:
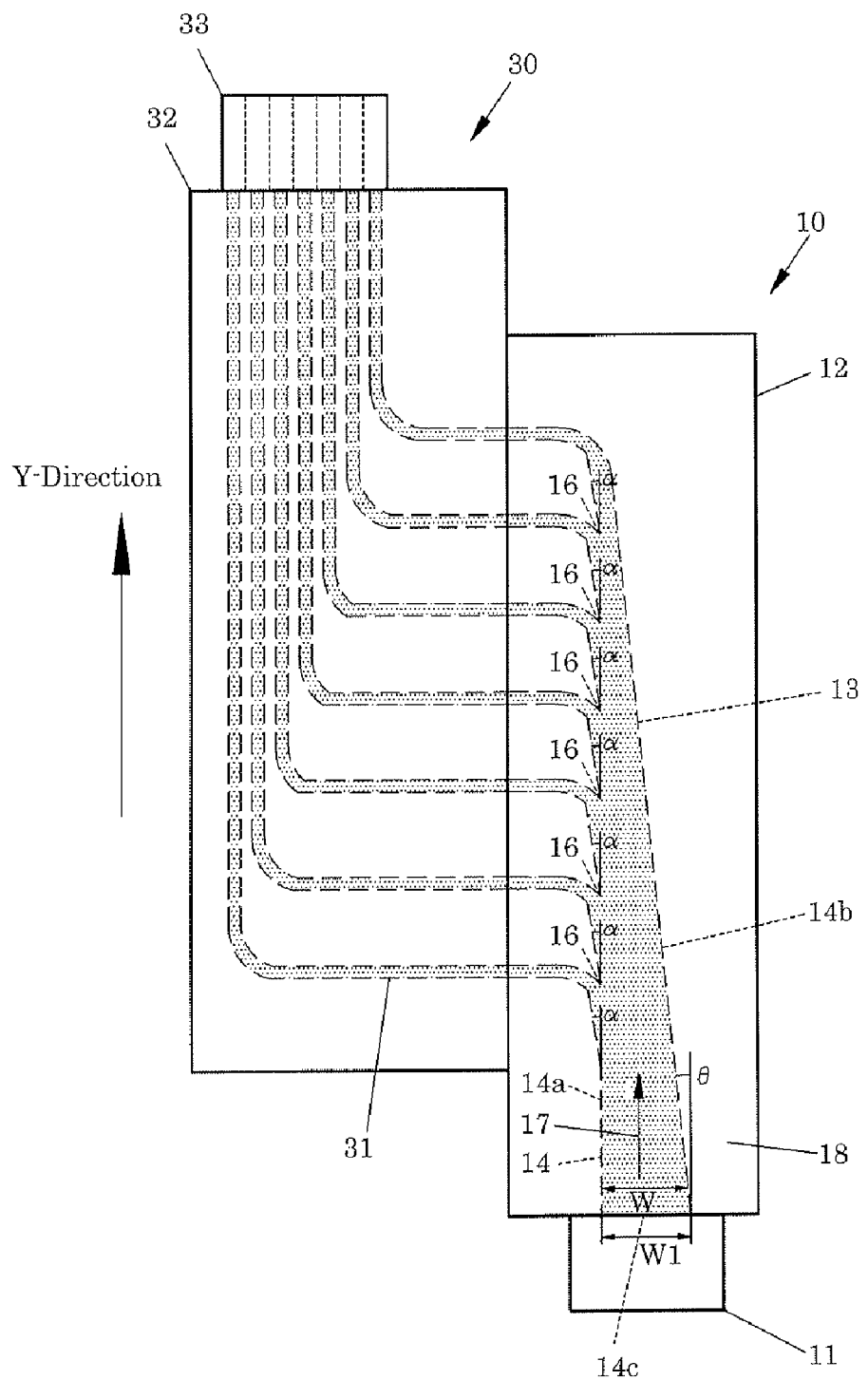
FIG. 6 is a configuration view for measuring light intensity of the optical waveguide with a light-emitting element of the present invention.
Figure 7:
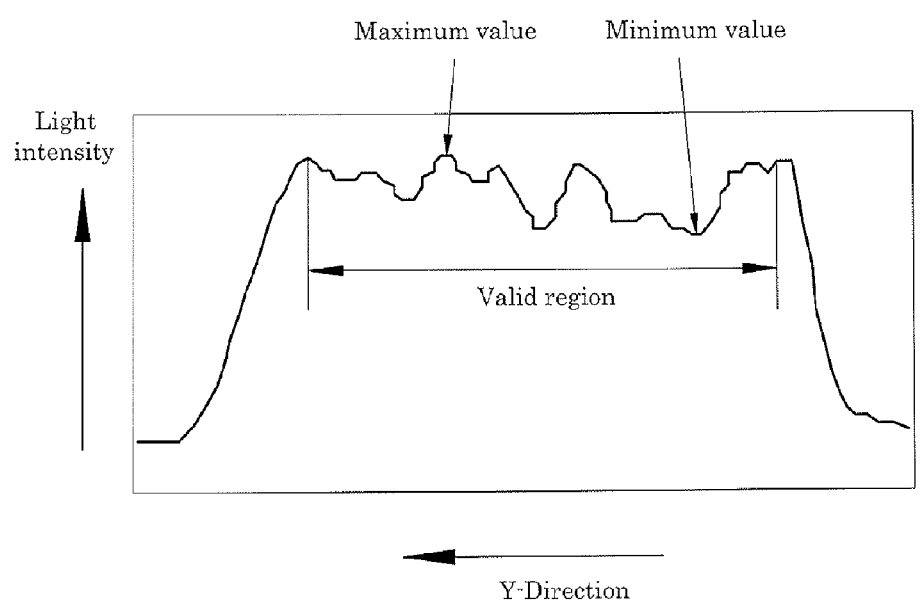
FIG. 7 is a light intensity distribution graph of Example 1 of the optical waveguide with a light-emitting element of the present invention.

[Evaluation 2]
[Formation of Optical Waveguide with Light-Receiving Element]
A light-receiving-sided optical waveguide 32 was produced in the same manner as in Example 1 except for changing the photo mask and making the structure of cores 31 as shown in FIG. 5. The number of the cores 31 is 274. The cores 31 respectively have a width of 15 μm and a height of 50 μm.
The ends of the cores 31 of the light-receiving sided-optical waveguide 32 were optically coupled via a UV curable resin to a light-receiving element 33 (CMOS linear sensor array produced by Hamamatsu Photonics Co., Ltd.) to produce an optical waveguide 30 with a light-receiving element.
[Preparation of a Sample for Measuring Light Intensity]
As shown in FIG. 6, in order to measure light intensity, the thus produced optical waveguide 10 with a light-emitting element and the optical waveguide 30 with a light-receiving element were allowed to face each other without crossing the coordinate input region. The control section of the light-receiving element 33 was connected to a USB capture unit (produced by National Instruments Corporation) via a flexible printed circuit board and then connected to a computer which is capable of monitoring the light intensity via USB port.
Light having an intensity of 7 μW and a wavelength of 850 μm was emitted from the light-emitting element 11 of the optical waveguide 10 with a light-emitting element. Light crossed through the light-emitting sided-optical waveguide 12 and the light-receiving sided-optical waveguide 32 and then reached the light-receiving element 33 to detect the light intensity distribution as shown in FIG. 7. The light intensity distribution shown in FIG. 7 is one example.
Table 2 shows variation (maximum value–minimum value) of light intensity distribution in a valid region (the region except for a rise and a drop) of the obtained light intensity distribution. As is seen from Table 2, the optical waveguide with a light-emitting element obtained in Examples 1 to 3 has more superior uniformity of light emitted from respective branched paths than the optical waveguide with a light-emitting element obtained in Comparative Example 2.

TABLE 2

|  |  |  | Light intensity (relative value) detected at a light-receiving element | | |
|---|---|---|---|---|---|
|  | Angle α (°) | Angle θ (°) | Maximum value | Minimum value | Maximum value – Minimum value |
| Example 1 | 0.85 | 0.7 | 3.5 | 2.2 | 1.3 |
| Example 2 | 0.1 | 0.4 | 3.3 | 1.8 | 1.5 |
| Example 3 | 1.4 | 1.0 | 3.3 | 2.0 | 1.3 |
| Comparative Example 2 | 0.05 | 0.2 | 3.5 | 0.7 | 2.8 |

[Measurement Methods]
[Refractive Index]
The varnish for forming a cladding layer and the varnish for forming cores were respectively applied onto silicon wafers by spin coating to form films thereon so that refractive-index measuring samples were prepared, and these were measured by using a prism coupler (manufactured by Sairon Technology, Inc.).
[Width and Height of Core]
An optical waveguide thus produced was cut crosswise using a dicing saw (DAD522 manufactured by DISCO Corporation), and the cutting surface of the optical waveguide was observed using a laser microscope (manufactured by Keyence Corporation) to measure the width and height of each core.

INDUSTRIAL APPLICABILITY

The applications of the optical touch panel 20 using the optical waveguide 10 with a light-emitting element are not particularly limited, but are used for personal computer monitors, bank ATM systems, portable game device, tablet personal computers or the like.
This application claims priority from Japanese Patent Application No. 2009-285844, which is incorporated herein by reference.
There have thus been shown and described a novel optical waveguide with a light-emitting element and a novel optical touch panel with the same which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical waveguide with a light-emitting element comprising:

a light-emitting element; and an optical waveguide including a core for guiding light emitted from the light-emitting element to generate a plurality of light beams, wherein the core comprises: a main path; and a plurality of branched paths branched at a plurality of branched points from the main path, wherein the main path has two sides, in which one side has a plurality of branched points and the other side does not have any branched points, the one side having a plurality of branches points and the other side without branched points are faced to each other, wherein the plurality of branched points are provided on a straight line substantially parallel to a light guiding direction of the main path, wherein the width of the main path becomes narrower as the main path moves away from the light-emitting element, wherein an angle a formed by the main path and the light guiding direction of the main path is 0.1° to 2.0° in each branched point where each branched path is branched from the main path, wherein an angle θ formed by the other side without branched points in the main path and the light guiding direction of the main path is 0.3° to 1.7°, and further wherein the plurality of light beams emitted from tips of the plurality of branched paths are parallel to one another at least in a portion thereof.

2. An optical touch panel equipped with the optical waveguide with a light-emitting element according to claim 1.

* * * * *